(12) United States Patent
Kimura et al.

(10) Patent No.: US 11,372,249 B2
(45) Date of Patent: Jun. 28, 2022

(54) INFORMATION PROCESSING DEVICE AND INFORMATION PROCESSING METHOD

(71) Applicant: SONY CORPORATION, Tokyo (JP)

(72) Inventors: Jun Kimura, Kanagawa (JP); Kasumi Takeda, Tokyo (JP); Tomohiro Ishii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/977,609

(22) PCT Filed: Jan. 23, 2019

(86) PCT No.: PCT/JP2019/002078
§ 371 (c)(1),
(2) Date: Sep. 2, 2020

(87) PCT Pub. No.: WO2019/176308
PCT Pub. Date: Sep. 19, 2019

(65) Prior Publication Data
US 2021/0041702 A1 Feb. 11, 2021

(30) Foreign Application Priority Data
Mar. 12, 2018 (JP) .............................. JP2018-043861

(51) Int. Cl.
*G02B 27/01* (2006.01)
*G06F 3/01* (2006.01)
(Continued)

(52) U.S. Cl.
CPC .......... *G02B 27/0172* (2013.01); *G06F 3/011* (2013.01); *G06F 3/017* (2013.01);
(Continued)

(58) Field of Classification Search
USPC .......................................................... 345/8
See application file for complete search history.

(56) References Cited

U.S. PATENT DOCUMENTS

| | | | |
|---|---|---|---|
| 2013/0050833 A1 | 2/2013 | Lewis et al. | |
| 2015/0109336 A1* | 4/2015 | Hayakawa | ............ G06T 19/006 345/633 |

(Continued)

FOREIGN PATENT DOCUMENTS

| | | |
|---|---|---|
| CN | 102928979 A | 2/2013 |
| CN | 105320271 A | 2/2016 |

(Continued)

OTHER PUBLICATIONS

International Search Report and Written Opinion of PCT Application No. PCT/JP2019/002078, dated Apr. 2, 2019, 11 pages of ISRWO.

*Primary Examiner* — Chineyere D Wills-Burns
(74) *Attorney, Agent, or Firm* — Chip Law Group

(57) ABSTRACT

Provided is an information processing device that includes a recognition unit that recognizes, based on a result of sensing by a sensor unit corresponding to a viewpoint position of a user, a hand gesture performed by the user to move, closer to a first object, a second object so that the positional relation between the first object and the second object becomes a first positional relation. The information processing device further includes a correction unit that corrects the user's interocular parameter related to virtual object display on a display unit based on a result of recognition of the hand gesture when it is determined that a predetermined end condition is satisfied. At least one of the first object and the second object is a virtual object.

18 Claims, 14 Drawing Sheets

(51) Int. Cl.
*G06V 40/20* (2022.01)
*H04N 13/344* (2018.01)
*G06T 7/20* (2017.01)

(52) U.S. Cl.
CPC ........... *G06V 40/28* (2022.01); *H04N 13/344* (2018.05); *G02B 2027/0134* (2013.01); *G02B 2027/0178* (2013.01)

(56) References Cited

U.S. PATENT DOCUMENTS

| | | | | |
|---|---|---|---|---|
| 2015/0302623 | A1* | 10/2015 | Ishikawa | G06V 10/225 345/629 |
| 2016/0012643 | A1 | 1/2016 | Kezele et al. | |
| 2016/0065952 | A1* | 3/2016 | Han | G06V 40/19 345/8 |
| 2016/0131908 | A1* | 5/2016 | Fateh | G06F 3/03547 345/633 |
| 2016/0353093 | A1* | 12/2016 | Lyon | G02B 27/017 |
| 2017/0237977 | A1* | 8/2017 | Patel | G02B 27/0176 348/53 |
| 2017/0287222 | A1* | 10/2017 | Fujimaki | G02B 27/0179 |
| 2017/0344107 | A1* | 11/2017 | Aghara | G06F 3/011 |
| 2018/0088340 | A1* | 3/2018 | Amayeh | G02B 27/0172 |
| 2018/0329672 | A1* | 11/2018 | Sadak | G06F 1/1677 |
| 2019/0285880 | A1* | 9/2019 | Tam | G02B 7/12 |

FOREIGN PATENT DOCUMENTS

| | | |
|---|---|---|
| EP | 2966863 A1 | 1/2016 |
| JP | 2012-138654 A | 7/2012 |
| JP | 2016-018213 A | 2/2016 |
| JP | 2016-219897 A | 12/2016 |
| KR | 10-2016-0007423 A | 1/2016 |
| WO | 2013/033170 A2 | 3/2013 |
| WO | 2016/191045 A1 | 12/2016 |

* cited by examiner

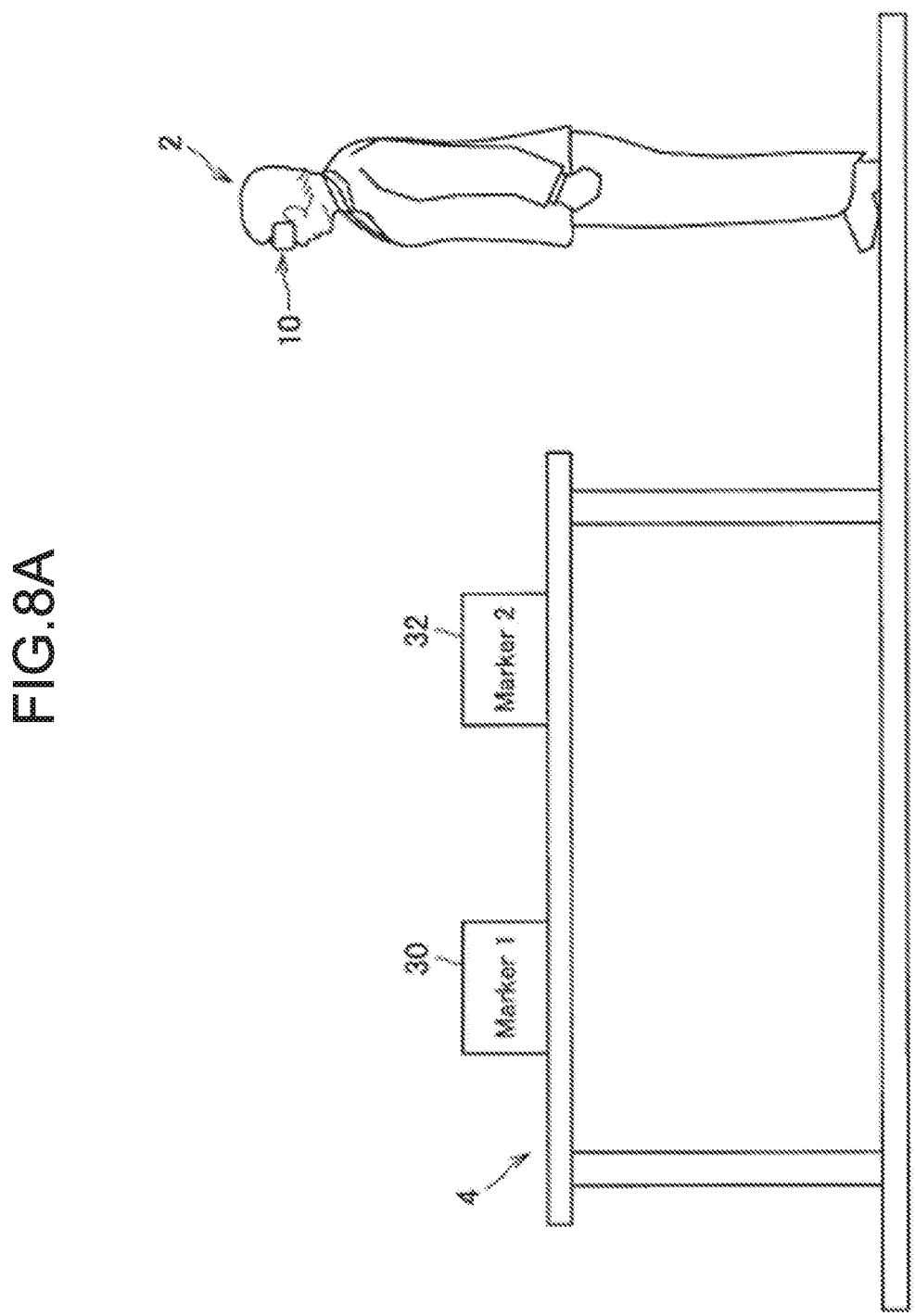

APPEARANCE OF VIRTUAL OBJECT IS ADJUSTED NEXT.
LOOK AT BOX-SHAPED MARKER PLACED ON TABLE.

ADJUSTMENT IS CARRIED OUT ON LEFT EYE FIRST.

VIRTUAL OBJECT WILL BE DISPLAYED IN FRONT OF YOU.
PRESS [SET] KEY ON MAIN BODY WHEN DISPLAY IS CONFIRMED.

HOLD ANOTHER MARKER IN HAND AND PRECISELY PLACE IT OVER VIRTUAL OBJECT IN FRONT OF YOU.

WAIT FOR A MOMENT.

REMOVE HAND FROM PLACED MARKER.

IS DISPLAYED VIRTUAL OBJECT PRECISELY PLACED?

WHEN VIRTUAL OBJECT IS NOT PRECISELY PLACED, HOLD MARKER IN HAND AND PLACE IT AGAIN.

WHEN VIRTUAL OBJECT IS PRECISELY PLACED, PRESS [SET] KEY ON MAIN BODY.

FIG.9H

ADJUSTMENT IS CARRIED OUT ON RIGHT EYE NEXT.

FIG.9I

ADJUSTMENT IS CARRIED OUT ON BOTH EYES NEXT.

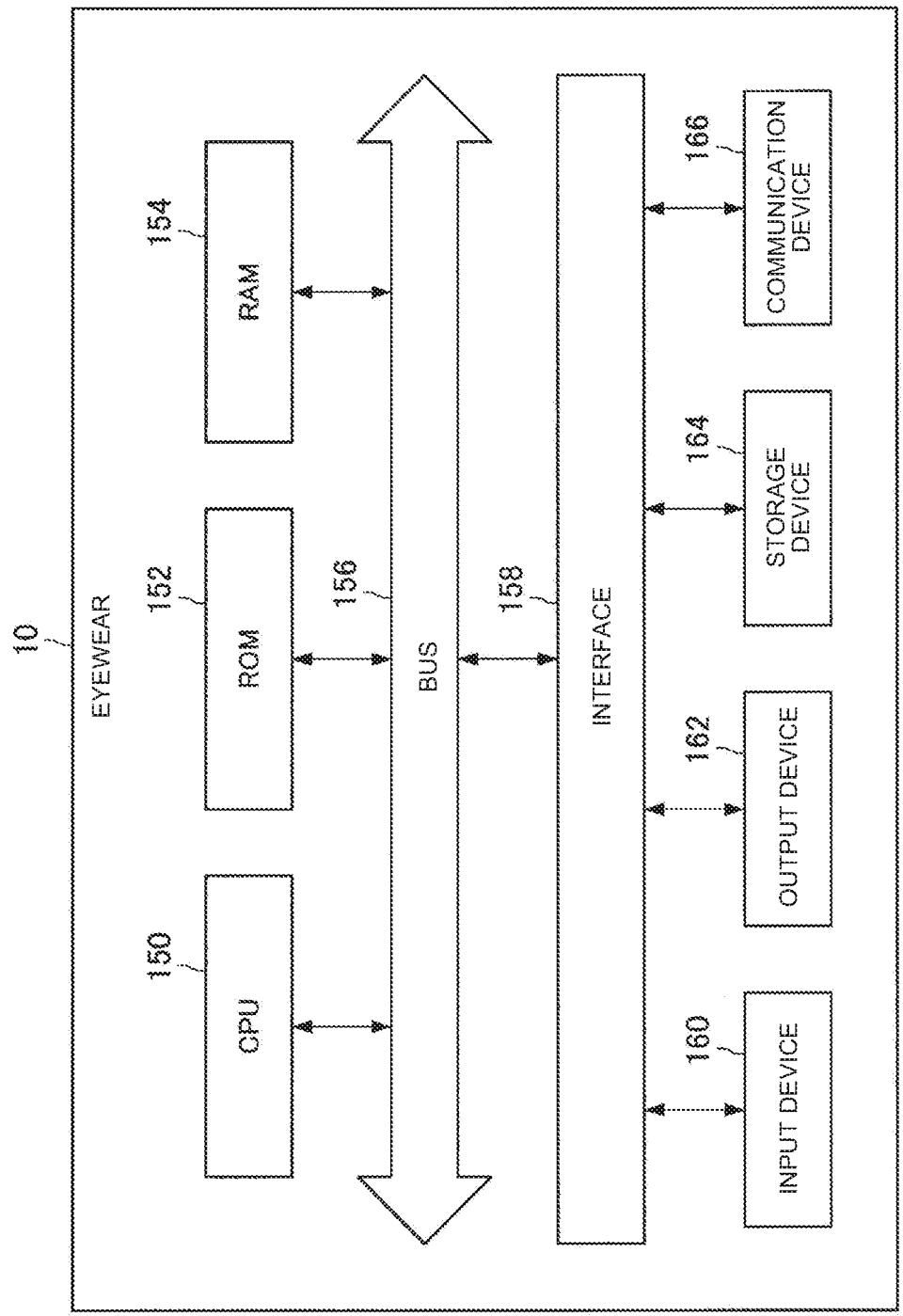

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/002078 filed on Jan. 23, 2019, which claims priority benefit of Japanese Patent Application No. JP 2018-043861 filed in the Japan Patent Office on Mar. 12, 2018. Each of the above-referenced applications is hereby incorporated herein by reference in its entirety.

FIELD

The present disclosure relates to an information processing device, an information processing method, and a computer program.

BACKGROUND

Conventionally, various technologies related to augmented reality (AR) have been developed. In addition, various optical devices (for example, a head-mounted display (HMD)) that enable a user to perceive a virtual image superimposed on an image of real space have been developed.

For example, Patent Literature 1 below discloses that a user on which an HMD is mounted adjusts its interpupil distance by operating an interpupil distance adjustment mechanism while observing signal patterns displayed on right and left displays unit.

CITATION LIST

Patent Literature

Patent Literature 1: Japanese Patent Application Laid-open No. 2012-138654

SUMMARY

Technical Problem

It is desired that the value of a user's interocular parameter related to virtual object display can be corrected. However, when it is assumed that the technology disclosed in Patent Literature 1 is applied in such a situation, a workload on a user is large with the technology disclosed in Patent Literature 1.

Thus, the present disclosure provides an information processing device, an information processing method, and a computer program that are novel and modified and enable correction of the value of a user's interocular parameter related to virtual object display through an easier operation.

Solution to Problem

According to the present disclosure, an information processing device is provided that includes: a recognition unit that recognizes, based on a result of sensing by a sensor unit corresponding to a viewpoint position of a user, a hand gesture performed by the user to move, closer to a first object, a second object so that the positional relation between the first object and the second object becomes a first positional relation; and a correction unit that corrects the user's interocular parameter related to virtual object display on a display unit based on a result of recognition of the hand gesture when it is determined that a predetermined end condition is satisfied, wherein at least one of the first object and the second object is a virtual object.

Moreover, according to the present disclosure, an information processing method is provided that includes: recognizing, based on a result of sensing by a sensor unit corresponding to a viewpoint position of a user, a hand gesture performed by the user to move, closer to a first object, a second object so that the positional relation between the first object and the second object becomes a first positional relation; and correcting, by a processor, the user's interocular parameter related to virtual object display on a display unit based on a result of recognition of the hand gesture when it is determined that a predetermined end condition is satisfied, wherein at least one of the first object and the second object is a virtual object.

Moreover, according to the present disclosure, a computer program is provided that causes a computer to function as: a recognition unit that recognizes, based on a result of sensing by a sensor unit corresponding to a viewpoint position of a user, a hand gesture performed by the user to move, closer to a first object, a second object so that the positional relation between the first object and the second object becomes a first positional relation; and a correction unit that corrects the user's interocular parameter related to virtual object display on a display unit based on a result of recognition of the hand gesture when it is determined that a predetermined end condition is satisfied, wherein at least one of the first object and the second object is a virtual object.

Advantageous Effects of Invention

According to the present disclosure as described above, the value of a user's interocular parameter related to virtual object display can be corrected through an easier operation. Note that the effect thus described is not necessarily limited but may be any effect described in the present disclosure.

BRIEF DESCRIPTION OF DRAWINGS

FIG. 8A is a diagram illustrating exemplary arrangement of a reference marker and an operation marker according to the present embodiment.

FIG. 9H is a diagram illustrating another exemplary screen displayed in the correction mode according to the exemplary execution.

FIG. 9I is a diagram illustrating another exemplary screen displayed in the correction mode according to the exemplary execution.

FIG. 12 is a diagram illustrating an exemplary hardware configuration of the eyewear 10 according to the present embodiment.

DESCRIPTION OF EMBODIMENTS

A preferable embodiment of the present disclosure will be described below in detail with reference to the accompanying drawings. Note that, in the present specification and drawings, components having functional configurations substantially identical to each other are denoted by an identical reference sign, and duplication description thereof are omitted.

In addition, in the present specification and drawings, a plurality of components having functional configurations substantially identical to each other may be denoted by an identical reference sign followed by different alphabets to distinguish the components from each other. For example, a plurality of components having functional configurations substantially identical to each other are distinguished from each other as necessary, such as between an eyewear 10a and an eyewear 10b. However, when not needed to be distinguished from each other, a plurality of components having functional configurations substantially identical to each other are denoted only by an identical reference sign. For example, when not needed to be distinguished from each other, the eyewear 10a and the eyewear 10b are simply referred to as an eyewear 10.

Figure 1:
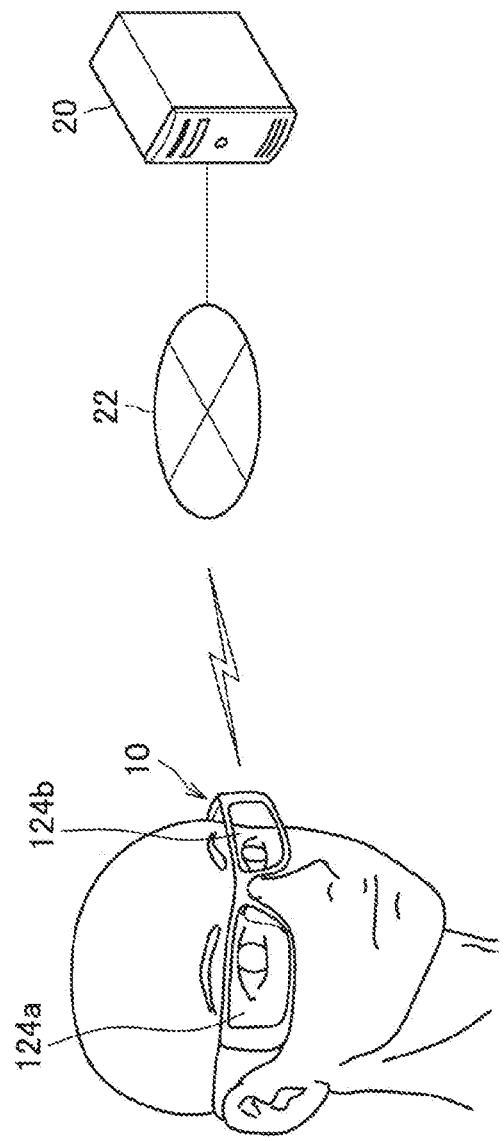
FIG. 1 is an explanatory diagram illustrating an exemplary configuration of an information processing system according to an embodiment of the present disclosure.

The description of "Description of Embodiments" is made in accordance with a content order described below.
1. Configuration of information processing system
2. Detailed description of embodiment
3. Exemplary application
4. Hardware configuration
5. Modifications 1. Configuration of Information Processing System The following first describes an exemplary configuration of an information processing system according to an embodiment of the present disclosure with reference to FIG. 1. As illustrated in FIG. 1, the information processing system according to the present embodiment includes an eyewear 10, a server 20, and a communication network 22.

<1-1. Eyewear 10>

The eyewear 10 is an exemplary information processing device according to the present disclosure. The eyewear 10 can control outputting of various contents. A content may include an image (a still image or a moving image) of a virtual object or the like, and/or sound such as music and voice. A virtual object may be a 2D object or a 3D object. Note that the eyewear 10 may receive a predetermined content from an external device such as the server 20 to be described later or the predetermined content may be stored in the eyewear 10 in advance.

As illustrated in FIG. 1, the eyewear 10 may be a head-mounted device. For example, the eyewear 10 may be a glass or goggle wearable device (for example, AR glasses or HMD).

{1-1-1. Display Unit 124}

As illustrated in FIG. 1, the eyewear 10 may include a right display unit 124a and a left display unit 124b (hereinafter collectively referred to as a display unit 124 in some cases). The display unit 124 may be configured as a transmissive display device. In this case, the right display unit 124a may project a video onto, as a projection surface, at least a partial region of a right eye lens (or a goggle lens) included in the eyewear 10. In addition, the left display unit 124b may project a video onto, as a projection surface, at least a partial region of a left eye lens (or a goggle lens) included in the eyewear 10.

Alternatively, the display unit 124 may be configured as a non-transmissive display device. For example, the display unit 124 may include a liquid crystal display (LCD) or an organic light emitting diode (OLED). In addition, the eyewear 10 may include a camera. In this case, a video of the front side of a user, which is captured by the camera, may be sequentially displayed on the display unit 124. Accordingly, the user can see scenery on the front side of the user through the video displayed on the display unit 124.

<1-2. Server 20>

The server 20 may be a device configured to store at least one content (such as a virtual object). For example, the server 20 stores, for each content, the content and position information in real space, which is associated with the content, in association with each other.

When having received a request for acquisition of a content from another device such as the eyewear 10, the server 20 may transmit the content corresponding to the acquisition request to the other device.

<1-3. Communication Network 22>

The communication network 22 is a wired or wireless transmission path of information transmitted from a device connected with the communication network 22. For example, the communication network 22 may include public networks such as a telephone network, the Internet, and a satellite communication network, and various local area networks (LAN) and wide area networks (WAN) including Ethernet (registered trademark). In addition, the communication network 22 may include a dedicated network such as an internet protocol-virtual private network (IP-VPN).

<1-4. Problem>

The configuration of the information processing system according to the present embodiment is described above. When an inappropriate value is set as an interocular parameter value, at display of a virtual object, the virtual object is presented to the user at a display position different from that intended by a developer. Thus, it is desired that the interocular parameter value can be appropriately corrected in such a case. However, with existing technologies, the accuracy of adjusting the interocular parameter value is low, or a load on the user for adjusting the interocular parameter value is large.

Thus, the eyewear 10 according to the present embodiment is created in view of the above-described circumstances. The eyewear 10 recognizes, based on a result of sensing by a sensor unit 122, a hand gesture performed by the user to move, closer to a first object, a second object so that the positional relation between the first object and the second object becomes a predetermined positional relation, and then, when it is determined that a predetermined end condition is satisfied, corrects an interocular parameter related to virtual object display on the display unit 124 based on a result of recognition of the hand gesture. Thus, the user can appropriately and easily correct the value of the interocular parameter related to virtual object display.

The first object may be a real object or may be a virtual object. The second object may be a real object or may be a virtual object. For example, at least one of the first object and the second object may be a virtual object. Hereinafter, contents of the present embodiment are sequentially described in detail.

2. Detailed Description of Embodiment

<2-1. Configuration>

Figure 2:
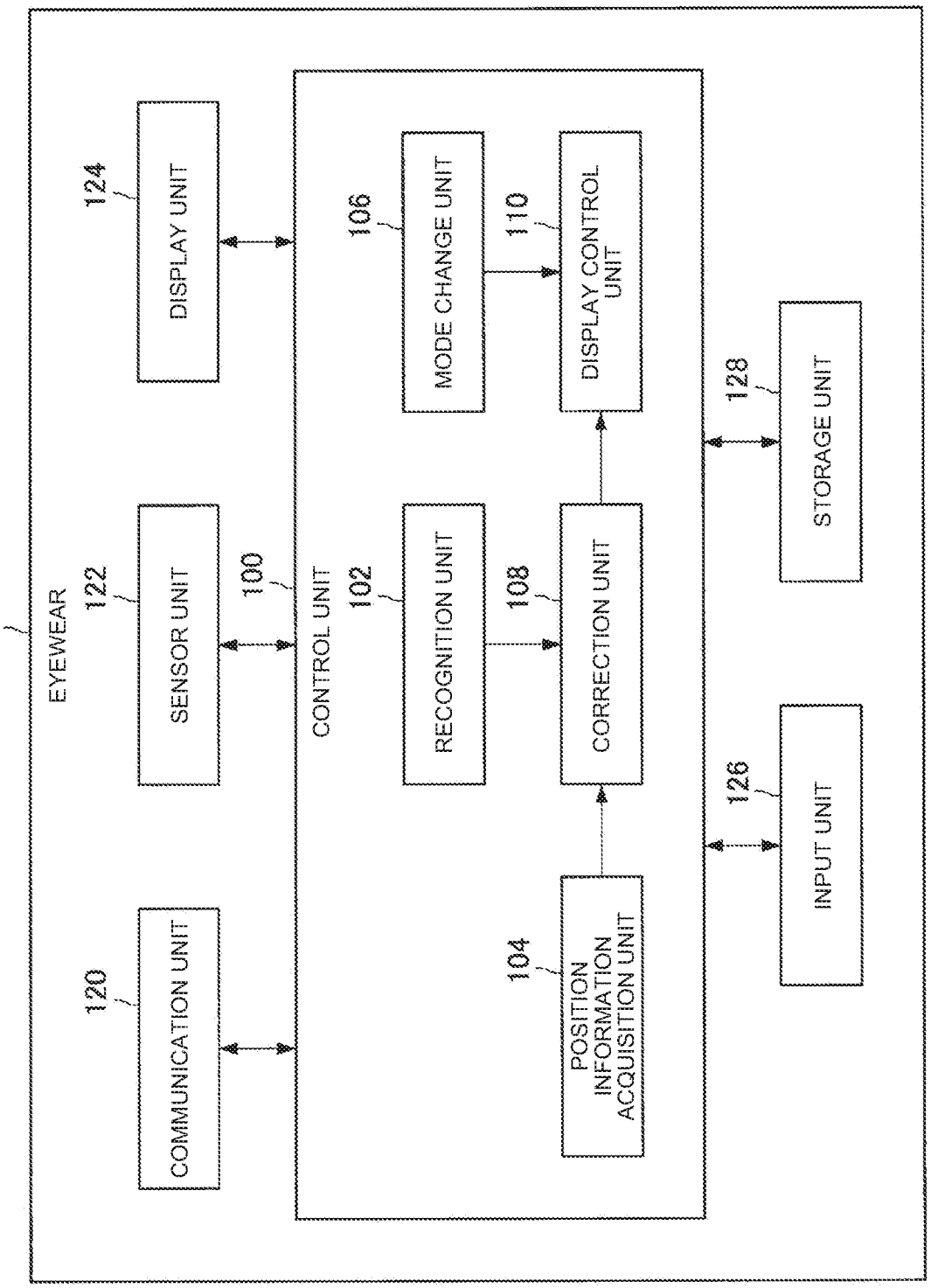
FIG. 2 is a block diagram illustrating an exemplary functional configuration of an eyewear 10 according to the present embodiment.

The following describes a functional configuration of an eyewear 10-1 according to the present embodiment. FIG. 2 is a block diagram illustrating an exemplary functional configuration of the eyewear 10. As illustrated in FIG. 2, the eyewear 10 includes a control unit 100, a communication unit 120, the sensor unit 122, the display unit 124, an input unit 126, and a storage unit 128.

{2-1-1. Sensor Unit 122}

The sensor unit 122 may include, for example, an outward camera (image sensor), an inward camera, a depth sensor (for example, a time-of-flight scheme sensor, a structured-light scheme sensor, or a stereo camera), a microphone, an acceleration sensor, a gyroscope, an azimuth sensor, a position measurement unit, and/or a living body sensor.

The outward camera can capture a video of the front side of the user while the eyewear 10 is mounted on the user. The inward camera can capture an image of eyes of the user. Accordingly, the direction of sight line of the user can be sensed.

The position measurement unit may include a receiver configured to receive positioning signals from positioning satellites of a global positioning system (GPS), a global navigation satellite system (GLONASS), or the like. Note that the position measurement unit can receive positioning signals from satellites of one kind or can receive positioning signals from satellites of a plurality of kinds, and can perform positioning of the current position by combining the received signals.

In addition, the sensor unit 122 can estimate the position (position information and height information) of the eyewear 10 by using a technology such as simultaneous localization and mapping (SLAM). For example, the sensor unit 122 first recognizes a particular object positioned around the eyewear 10 based on an image captured by the outward camera (of the sensor unit 122), a result of sensing by the depth sensor, and the like, and senses the distance to the object. Subsequently, the sensor unit 122 acquires position information of the object from, for example, a predetermined device, and then estimates the position of the eyewear 10 based on the acquired position information and a result of sensing of the distance to the object. Alternatively, the sensor unit 122 may sense position information of the eyewear 10 by combining a result of the position estimation and a result of the above-described positioning by the position measurement unit.

In addition, the sensor unit 122 can sense direction information indicating a direction in which the eyewear 10 points based on, for example, combination of a result of sensing by the gyroscope and a result of sensing by the acceleration sensor.

{2-1-2. Control Unit 100}

The control unit 100 may include a processing circuit such as a central processing unit (CPU) 150 to be described later or a graphics processing unit (GPU). The control unit 100 can collectively control the eyewear 10. In addition, as illustrated in FIG. 2, the control unit 100 includes a recognition unit 102, a position information acquisition unit 104, a mode change unit 106, a correction unit 108, and a display control unit 110.

{2-1-3. Recognition Unit 102}

The recognition unit 102 performs various kinds of recognition processing based on a result of sensing by the sensor unit 122. For example, the recognition unit 102 recognizes, based on a result of sensing by the sensor unit 122, a hand gesture (hereinafter also referred to as "calibration hand gesture") performed by the user to move the second object closer to the first object so that the positional relation between the first object and the second object becomes a predetermined positional relation. Although described later in detail, the hand gesture may be a gesture that moves a virtual object 42 displayed in association with an operation marker 32 closer to a first virtual object 40 displayed in association with a reference marker 30 (a table 30 in the example illustrated in FIG. 3) so that the virtual object 42 is placed over the first virtual object 40 as illustrated in, for example, FIG. 3. Alternatively, the hand gesture may be a gesture that moves the operation marker 32 so that the virtual object 42 displayed in association with the operation marker 32 is placed over the reference marker 30. Note that the reference marker is an exemplary first marker according to the present disclosure. The operation marker is an exemplary second marker according to the present disclosure.

The first object and the second object may be three-dimensional objects. In addition, the shape of the second object may be an asymmetric shape (for example, the shape of an animal or a character) with which the rotation and direction thereof are uniquely determined like an object 40 illustrated in, for example, FIG. 6. Accordingly, the user can uniquely adjust the orientation and position of the second object.

Figure 3:
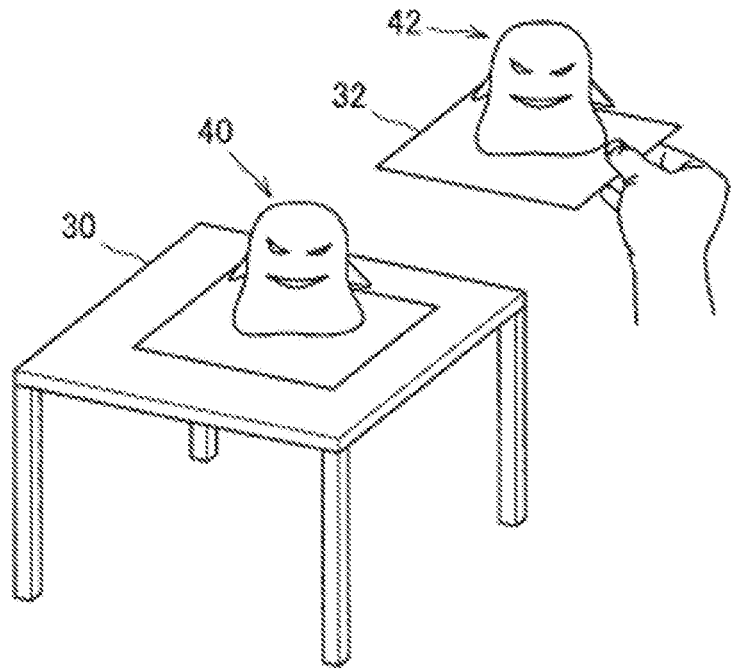
FIG. 3 is a diagram illustrating an exemplary interocular parameter correction operation.

Note that, when the first object is a virtual object as illustrated in FIG. 3, the first object can be displayed on the display unit 124 in association with a reference marker corresponding to the first object under control of the display control unit 110 to be described later. When the second object is a virtual object, the second object can be displayed on the display unit 124 in association with an operation marker corresponding to the second object under control of the display control unit 110.

(2-1-3-1. Specific Example of Predetermined Positional Relation)

The following describes a specific example of the above-described predetermined positional relation. For example, the predetermined positional relation may be a positional relation in which substantially the whole of the first object and substantially the whole of the second object overlap each other.

Figure 4:
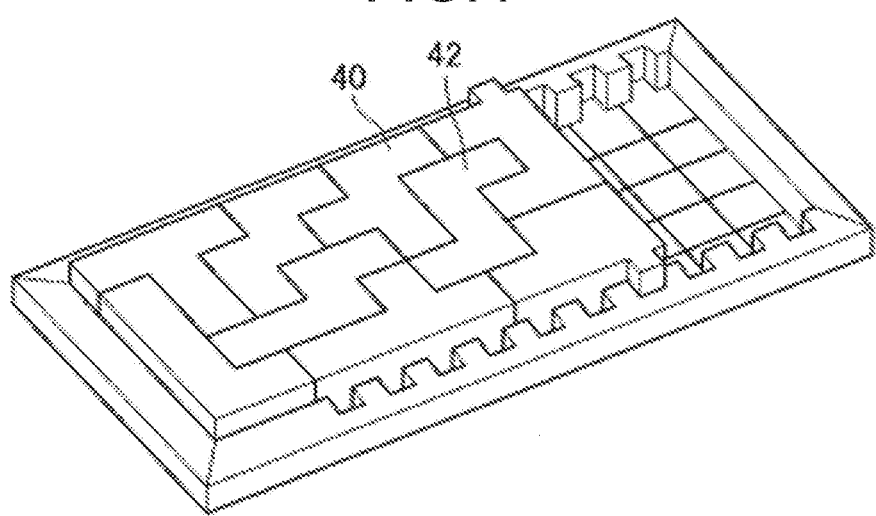
FIG. 4 is a diagram illustrating an exemplary positional relation between a first object and a second object for interocular parameter value correction.
Figure 5:
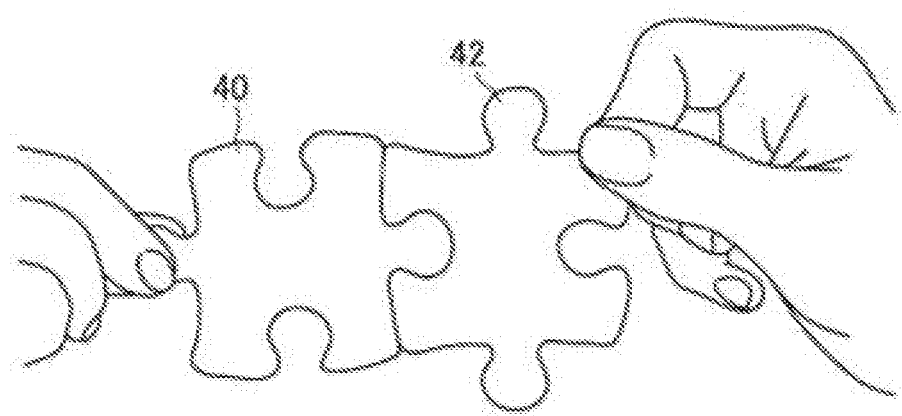
FIG. 5 is a diagram illustrating another exemplary positional relation between the first object and the second object for interocular parameter value correction.

Alternatively, the predetermined positional relation may be a positional relation in which the first object and the second object are adjacent to each other as illustrated in, for example, FIGS. 4 and 5. For example, the first object may include a first surface having irregularities, and the second object may include a second surface having irregularities corresponding to the irregularities of the first surface. In this case, the predetermined positional relation may be a positional relation in which the first object and the second object are adjacent to each other so that at least part of the irregularities of the first surface and at least part of the irregularities of the second surface are fitted to each other. For example, as illustrated in FIG. 4, the shape of a first object 40 and the shape of a second object 42 may be different from each other, and the shape of a part of the first object 40 and the shape of a part of the second object 42 may have an irregularity correspondence relation. Alternatively, as illustrated in FIG. 5, the first object and the second object may each have the shape of a puzzle piece. In the examples illustrated in FIGS. 4 and 5, the predetermined positional relation may be a positional relation in which irregularities of a surface of the first object are fitted to irregularities of a surface of the second object.

Figure 6:
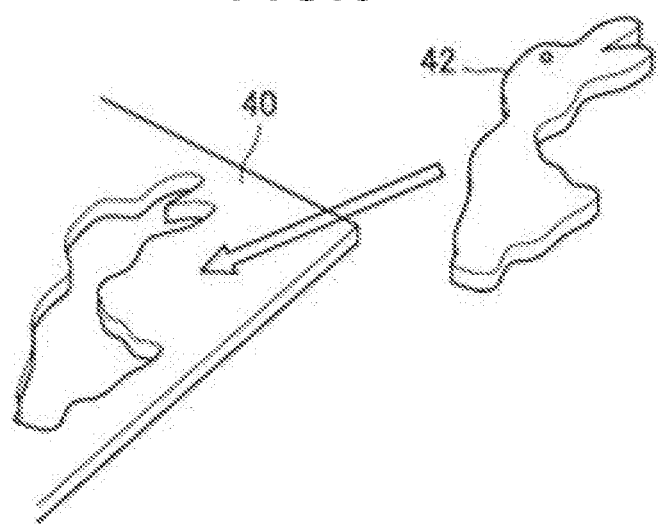
FIG. 6 is a diagram illustrating another exemplary positional relation between the first object and the second object for interocular parameter value correction.

Alternatively, the predetermined positional relation may be, for example, a positional relation in which any one of the first object and the second object has an opening part and the other of the first object and the second object is enclosed in the opening part as illustrated in FIG. 6. In the example illustrated in FIG. 6, the first object 40 has an opening part having a shape corresponding to the shape of the second object 42, and the second object 42 can be enclosed in the opening part. In this case, the predetermined positional relation may be a positional relation when the second object 42 is disposed so that the second object 42 is enclosed in the opening part.

Figure 7:
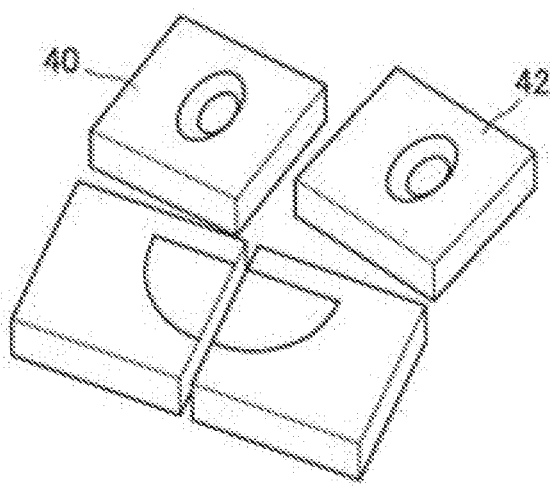
FIG. 7 is a diagram illustrating another exemplary positional relation between the first object and the second object for interocular parameter value correction.

Alternatively, the first object may have a first surface including a first image, and the second object may have a second surface including a second image corresponding to the first image. In this case, the predetermined positional relation may be a positional relation in which the first object and the second object are adjacent to each other while the positional relation between the first image and the second image is a predetermined particular positional relation. In other words, the predetermined positional relation may be a positional relation in which the first object and the second object are arranged so that the first image and the second image form a particular image pattern. In the example illustrated in FIG. 7, an image of a right eye is drawn (or displayed) on a surface of the first object, and an image of a left eye is drawn (or displayed) on a surface of the second object. In this case, the predetermined positional relation may be a positional relation in which the first object and the second object are adjacent to each other so that the image of a right eye and the image of a left eye are arranged side by side.

{2-1-4. Position Information Acquisition Unit 104}

The position information acquisition unit 104 is an exemplary acquisition unit according to the present disclosure. When a reference marker is detected, the position information acquisition unit 104 acquires position information corresponding to the reference marker through, for example, readout processing or reception. For example, the position information acquisition unit 104 first specifies identification information of the reference marker based on a result (such as a captured image) of sensing of the reference marker, and then causes the communication unit 120 to transmit a query for position information corresponding to the specified identification information to the server 20. Then, the position information acquisition unit 104 acquires the position information corresponding to the reference marker through reception from the server 20.

Alternatively, the storage unit 128 to be described later may store identification information of an individual reference marker and position information of the reference marker in association with each other. In this case, the position information acquisition unit 104 may first specify identification information of the reference marker based on a result of sensing of the reference marker. Then, position information corresponding to the reference marker may be acquired by extracting position information corresponding to the specified identification information from the storage unit 128.

The identification information of a reference marker may be a bar code recorded in the reference marker or may be a natural image printed or displayed on the reference marker.

(2-1-4-1. Modifications)

The method of position information acquisition by the position information acquisition unit 104 is not limited to the above-described example. For example, a light emitting diode (LED) may be disposed at a reference marker or at a position related to the reference marker in real space. In this case, the position information acquisition unit 104 may acquire position information corresponding to the reference marker based on a flashing pattern of the LED.

Alternatively, predetermined identification information may be recorded in a reference marker by using paint that reflects infrared light. In this case, when the eyewear 10 emits infrared light to the reference marker, the sensor unit 122 may sense the infrared light reflected by the reference marker and then may query position information corresponding to sensed identification information to an external device (for example, the server 20), thereby acquiring position information corresponding to the reference marker.

Alternatively, the eyewear 10 may perform three-dimensional object recognition of a reference marker based on a result of sensing by the sensor unit 122 (such as a camera or a depth sensor) and then may query position information corresponding to a result of the recognition to an external device (for example, the server 20), thereby acquiring position information corresponding to the reference marker.

{2-1-5. Mode Change Unit 106}

The mode change unit 106 changes the current mode (execution mode) based on a predetermined condition.

For example, modes of two kinds, namely, a correction mode and a normal mode may be prepared in advance. In this case, the mode change unit 106 changes the current mode between the normal mode and the correction mode based on a predetermined condition. The correction mode may be a mode in which the above-described interocular parameter correction processing is performed by the correction unit 108.

(2-1-5-1. Start Condition)

For example, when it is determined that a predetermined start condition is satisfied, the mode change unit 106 sets the current mode to be the correction mode. The predetermined start condition may be detection of a reference marker based on sensing by the sensor unit 122 to be described later (for example, image capturing by a camera). Alternatively, the predetermined start condition may be detection of the user having approached in a predetermined distance from the reference marker. Alternatively, the predetermined start condition may be detection of the user having moved into a predetermined space (such as a room) in which the reference marker is positioned. Alternatively, the predetermined start condition may be execution of predetermined wireless communication between a predetermined electronic device (for example, an IC card or a smartphone) brought with the user and the reference marker and establishment of authentication. The predetermined electronic device may be an operation marker.

(2-1-5-2. End Condition)

When it is determined that a predetermined end condition is satisfied, the mode change unit 106 changes the current mode from the correction mode to the normal mode. Accordingly, an interocular parameter value corrected by the correction unit 108 to be described later in the correction mode can be used thereafter.

The predetermined end condition may be detection of separation of a hand from an operation marker. Alternatively, the predetermined end condition may be elapse of a predetermined time since, for example, calibration start (time-out). Alternatively, the predetermined end condition may be inputting of a dedicated voice command.

Alternatively, the predetermined end condition may be determination of end of a calibration hand gesture. For example, when it is detected that the shape of a hand has changed to a shape different from the shape of the calibration hand gesture, the mode change unit 106 may determine that the calibration hand gesture is ended.

Alternatively, the predetermined end condition may be detection, in the correction mode, of a predetermined hand gesture (for example, pinch) for ending the correction mode (or calibration). Alternatively, the predetermined end condition may be detection, in the correction mode, of a predetermined head gesture (for example, nod) for ending the correction mode (or calibration). Alternatively, the predetermined end condition may be detection of the distance between a reference marker and the user having become equal to or larger than a predetermined distance.

Alternatively, when an operation marker is an electronic device (for example, an IC card) storing predetermined information, the predetermined end condition may be execution of predetermined wireless communication between the operation marker and a reference marker or an electronic device associated with the reference marker and establishment of predetermined authentication. Alternatively, the predetermined end condition may be execution of predetermined wireless communication between a predetermined electronic device (for example, a smartphone or a tablet terminal) brought with the user and a reference marker or an electronic device associated with the reference marker.

{2-1-6. Correction Unit 108}

The correction unit 108 corrects the user's interocular parameter related to virtual object display on the display unit 124 based on a result of recognition by the recognition unit 102. For example, when it is determined that the above-described predetermined end condition is satisfied in the correction mode, the correction unit 108 corrects the interocular parameter based on a result of recognition of a calibration hand gesture. For example, the correction unit 108 corrects the interocular parameter based on a result of measurement of the distance between the first object and the second object when the above-described predetermined end condition is satisfied.

The following describes the above-described function in more detail with reference to FIGS. 8A, 8B, 8C, and 8D. In the example illustrated in FIG. 8A, the reference marker 30 and the operation marker 32 are disposed on a table 4.

Figure 8B:
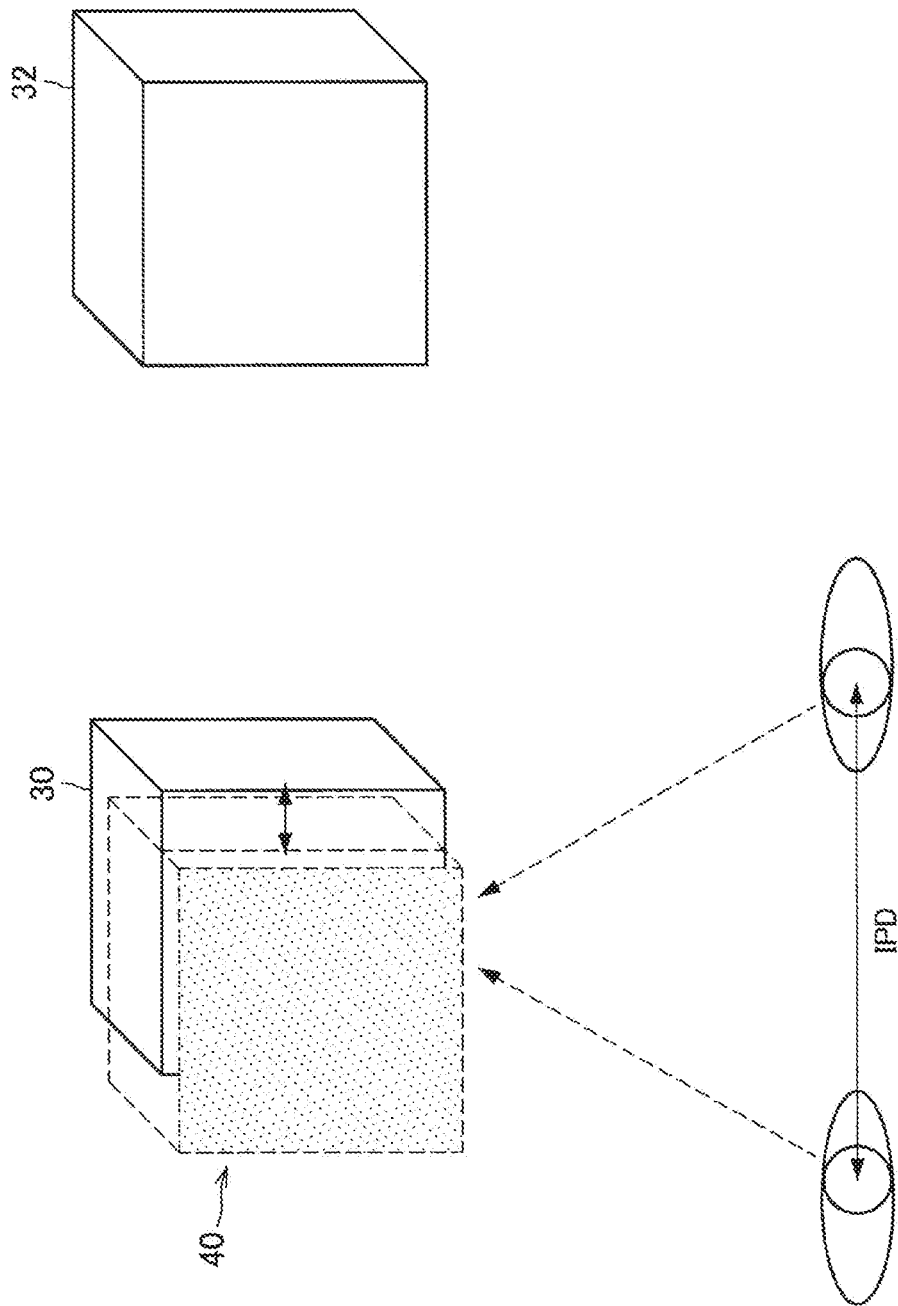
FIG. 8B is a diagram illustrating an example in which a virtual object is displayed on the reference marker in a superimposed manner.

Assume that the reference marker 30 is detected based on image capturing by a camera included in the sensor unit 122 of the eyewear 10. In this case, as illustrated in FIG. 8B, by using the current interocular parameter value (for example, an initial value), the display control unit 110 to be described later causes the display unit 124 to display, around the reference marker 30 (for example, on the reference marker 30), a virtual object 40 (in the example illustrated in FIG. 8B, a cube 40) corresponding to the reference marker 30. Note that, by using information of the position of the eyewear 10 estimated in real time by using a result of sensing by the sensor unit 122, the display control unit 110 may control display of the virtual object 40 so that a superimposed position of the virtual object 40 is not shifted from the reference marker 30. Accordingly, the reference marker 30 and the virtual object 40 can be visually recognized by the user so that the positional relation therebetween is not changed when the user moves (in other words, when the position of the eyewear 10 changes). The virtual object 40 is an exemplary first object.

Figure 8C:
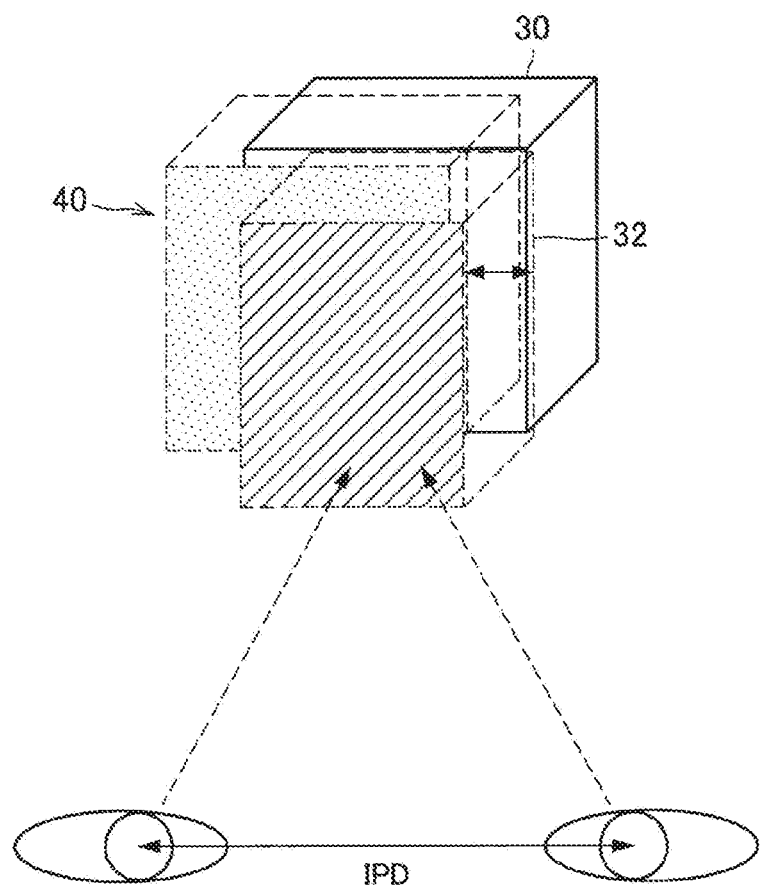
FIG. 8C is a diagram illustrating an exemplary operation of the operation marker relative to the virtual object corresponding to the reference marker by a user to correct the value of an interocular parameter.
Figure 8D:
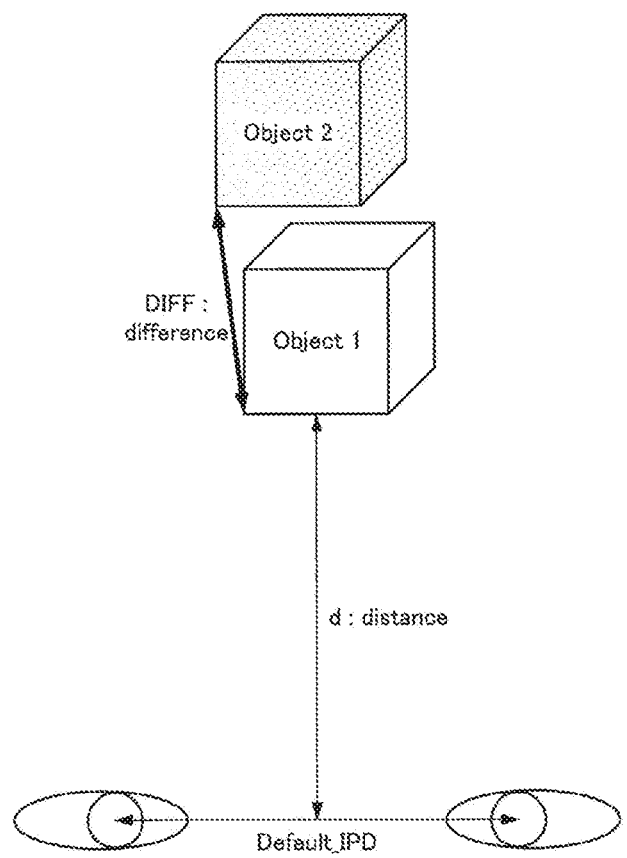
FIG. 8D is a diagram for description of an interocular parameter correction method.

Thereafter, as illustrated in FIG. 8C, the user moves the operation marker 32 (in other words, performs a calibration hand gesture) so that the operation marker 32 is placed over the cube 40. Note that the virtual object 42 may be displayed on the operation marker 32 in a superimposed manner, and in this case, the user performs an operation such as movement of the operation marker 32 so that the virtual object 42 is placed over the cube 40.

Thereafter, the correction unit 108 corrects the value of the user's interocular parameter related to virtual object display based on the position information of the reference marker 30, which is acquired by the position information acquisition unit 104, the distance between the viewpoint position of the user and the reference marker 30, which is sensed by the depth sensor included in the sensor unit 122, and the distance between (difference amount of) the virtual object 40 and the operation marker 32. Note that, when the virtual object 42 is displayed on the operation marker 32 in a superimposed manner, the correction unit 108 may correct the interocular parameter value by using the distance between the virtual object 42 and the operation marker 32 in place of the distance between the virtual object 40 and the operation marker 32.

For example, the relation among a result (=d) of sensing of the distance between the viewpoint position of the user and the reference marker 30, the distance (=DIFF) between the virtual object 40 and the operation marker 32, the interocular parameter value (=defaultIPD) yet to be corrected, and the interocular parameter value (=userIPD) corrected by the correction unit 108 is given by Expression (1) below. Note that, for example, the average value of the human interocular distance may be used as the initial value of defaultIPD. The average value of the interocular distance may be determined by using publicly available typical human body model information or the like.

$$\text{default\_IPD}: d = \text{User\_IPD}:(d+\text{DIFF}) \quad (1)$$

Specifically, the correction unit 108 calculates the corrected interocular parameter value by using, for example, Expression (2) below.

$$\text{User\_IPD} = \text{default\_IPD} \cdot \frac{(d + \text{DIFF})}{d} \quad (2)$$

{2-1-7. Display Control Unit 110}

The display control unit 110 controls display of various kinds of information on the display unit 124. For example, when the first object is a virtual object, the display control unit 110 causes the display unit 124 to display the first object in association with a reference marker. When the second object is a virtual object, the display control unit 110 causes the display unit 124 to display the second object in association with an operation marker.

For example, when the current mode is changed from the normal mode to the correction mode, the display control unit 110 causes the display unit 124 to display the first object in association with a reference marker and causes the display unit 124 to display the second object in association with an operation marker.

{2-1-8. Communication Unit 120}

The communication unit 120 may include a communication device 166 to be described later. For example, the communication unit 120 transmits and receives information to and from another device through the communication network 22. For example, the communication unit 120 may receive at least one virtual object from the server 20. In addition, the communication unit 120 may transmit a request for acquisition of at least one virtual object to the server 20 in accordance with control of the control unit 100.

{2-1-9. Input Unit 126}

The input unit 126 may include an input device 160 to be described later. For example, the input unit 126 includes a touch panel, a button, a switch, a lever, a microphone (voice input unit), or the like. The input unit 126 receives an input from the user.

{2-1-10. Storage Unit 128}

The storage unit 128 may include a storage device 164 to be described later. The storage unit 128 stores various kinds of data (for example, at least one virtual object and the initial value of the interocular parameter) and various software applications.

<2-2. Exemplary Execution>

The configuration of the present embodiment is described above. The following describes an exemplary execution of the present embodiment with reference to FIGS. 9A, 9B, 9C, 9D, 9E, 9F, 9G, 9H, and 9I. In the present exemplary execution, the interocular parameter value related to each of the left eye, the right eye, and both eyes is set to correct a definitive interocular parameter value.

For example, when it is determined that the above-described predetermined start condition is satisfied, the mode change unit 106 of the eyewear 10 sets the current mode to be the correction mode. Then, the display control unit 110 displays a screen of a frame or the like as illustrated in, for example, FIG. 9A on a display frame of a display (the display unit 124) or the like to prevent mounting error of the eyewear 10.

Thereafter, the mounting position of the eyewear 10 is adjusted, and then the user presses down, as a setting operation, for example, a "set" key included in the input unit 126. Note that the setting operation may be, for example, time-out, inputting of a predetermined voice command, inputting of a predetermined hand gesture, or inputting of a predetermined head gesture (such as a nod) instead of press-down of the "set" key.

Figure 9A:
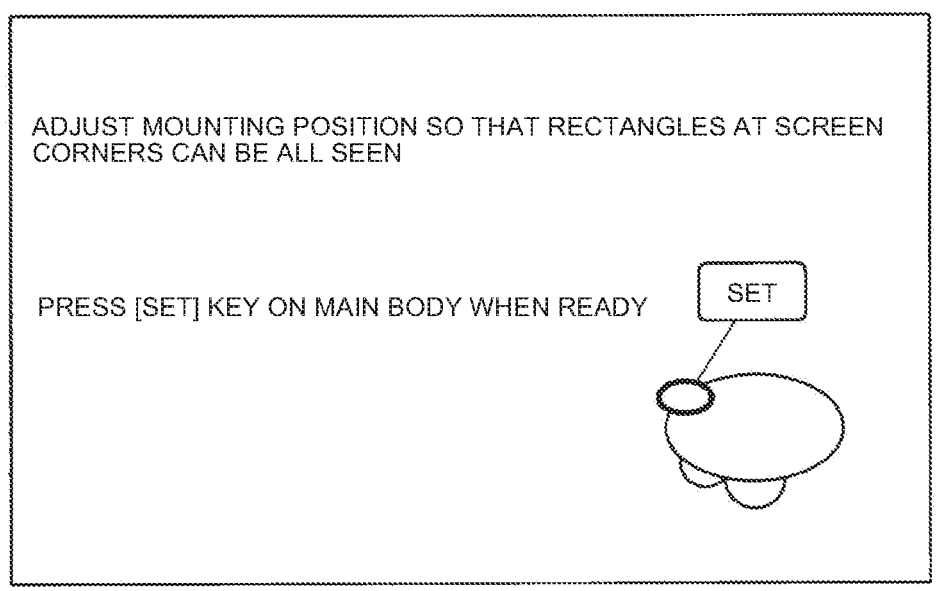
FIG. 9A is a diagram illustrating an exemplary screen displayed in a correction mode according to an exemplary execution of the present disclosure.
Figure 9B:
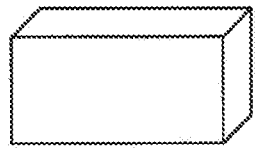
FIG. 9B is a diagram illustrating another exemplary screen displayed in the correction mode according to the exemplary execution.

Thereafter, the display control unit 110 causes the display unit 124 to display a screen as illustrated in FIG. 9B. Then, the user looks at a reference marker disposed on, for example, a table, following instruction information displayed on the screen.

Figure 9C:
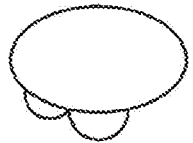
FIG. 9C is a diagram illustrating another exemplary screen displayed in the correction mode according to the exemplary execution.

Thereafter, for example, the control unit 100 detects the reference marker based on a result of sensing by the sensor unit 122. In this case, the display control unit 110 causes the display unit 124 to display a screen indicating start of calibration of the interocular parameter related to the left eye, as illustrated in FIG. 9C.

Figure 9D:
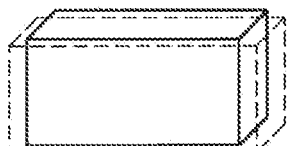
FIG. 9D is a diagram illustrating another exemplary screen displayed in the correction mode according to the exemplary execution.

Thereafter, the display control unit 110 causes the display unit 124 to display a screen indicating start of calibration of the interocular parameter, as illustrated in FIG. 9D. Then, the display control unit 110 causes the display unit 124 to display the first object (as a virtual object) in association with the reference marker.

Thereafter, the user visually checks the first object displayed on the display unit 124, following instruction information displayed on the screen, and then presses down, for example, a "set" key included in the input unit 126.

Figures 9E, 9F, 9G:
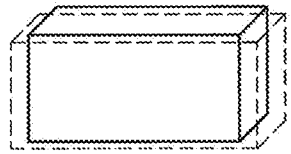
FIG. 9E is a diagram illustrating another exemplary screen displayed in the correction mode according to the exemplary execution.
FIG. 9F is a diagram illustrating another exemplary screen displayed in the correction mode according to the exemplary execution.
FIG. 9G is a diagram illustrating another exemplary screen displayed in the correction mode according to the exemplary execution.

Thereafter, when it is confirmed that the "set" key is pressed down, the display control unit 110 causes the display unit 124 to display a screen that prompts the user to perform a calibration hand gesture, as illustrated in FIG. 9E.

Thereafter, the user holds an operation marker in hand and then moves the operation marker so that the second object displayed on the operation marker in a superimposed manner is placed over the first object.

Thereafter, the correction unit 108 determines whether a predetermined set condition is satisfied. The predetermined set condition may be identical to any one of the above-described predetermined end conditions.

Then, when it is determined that the predetermined set condition is satisfied, the display control unit 110 causes the display unit 124 to display a waiting screen as illustrated in FIG. 9F. Simultaneously, the correction unit 108 sets (corrects) the interocular parameter value related to the left eye based on position information of the reference marker, a result of sensing of the distance between the viewpoint position of the user and the reference marker by the sensor unit 122, and the distance between (difference amount of) the first object and the second object.

Thereafter, the display control unit 110 causes the display unit 124 to display a confirmation screen for confirming end of the calibration hand gesture (for correcting the interocular parameter value related to the left eye), as illustrated in FIG. 9G. When the user desires to perform the calibration hand gesture again, the control unit 100 causes the display unit 124 to display the screen as illustrated in FIG. 9E again and performs the above-described calibration of the interocular parameter (related to the left eye) again.

When the user does not desire to perform the calibration hand gesture again, the user presses down, for example, the "set" key included in the input unit 126 in accordance with the confirmation screen as illustrated in FIG. 9G. Accordingly, the correction unit 108 fixes the corrected interocular parameter value related to the left eye.

Thereafter, the display control unit 110 causes the display unit 124 to display a screen indicating start of calibration of the interocular parameter related to the right eye, as illustrated in FIG. 9H. Thereafter, the control unit 100 causes the display unit 124 to sequentially display screens as illustrated in FIGS. 9D, 9E, 9F, and 9G again, thereby setting (correcting) the interocular parameter value related to the right eye.

Thereafter, the display control unit 110 causes the display unit 124 to display a screen indicating start of calibration of the interocular parameter related to both eyes, as illustrated in FIG. 9I. Thereafter, the control unit 100 causes the display unit 124 to sequentially display screens as illustrated in FIGS. 9D, 9E, 9F, and 9G again, thereby setting (correcting) the interocular parameter value related to both eyes.

Thereafter, the correction unit 108 corrects a definitive interocular parameter value by using the interocular parameter value (LeftEye) set for the left eye, the interocular parameter value (RightEye) set for the right eye, the interocular parameter value (BothEye) set for both eyes, and Expression (3) below.

$$\text{User\_IPD} = \alpha \cdot \text{BothEye} + \beta \cdot \text{RightEye} + \gamma \cdot \text{LeftEye} \quad (3)$$

In the expression, coefficients ($\alpha$, $\beta$, and $\gamma$) are arbitrary values of 0 to 1, and the values of the coefficients can be set so that the sum of the coefficients is equal to 1.0.

<2-3. Processing Process>

Figure 10:
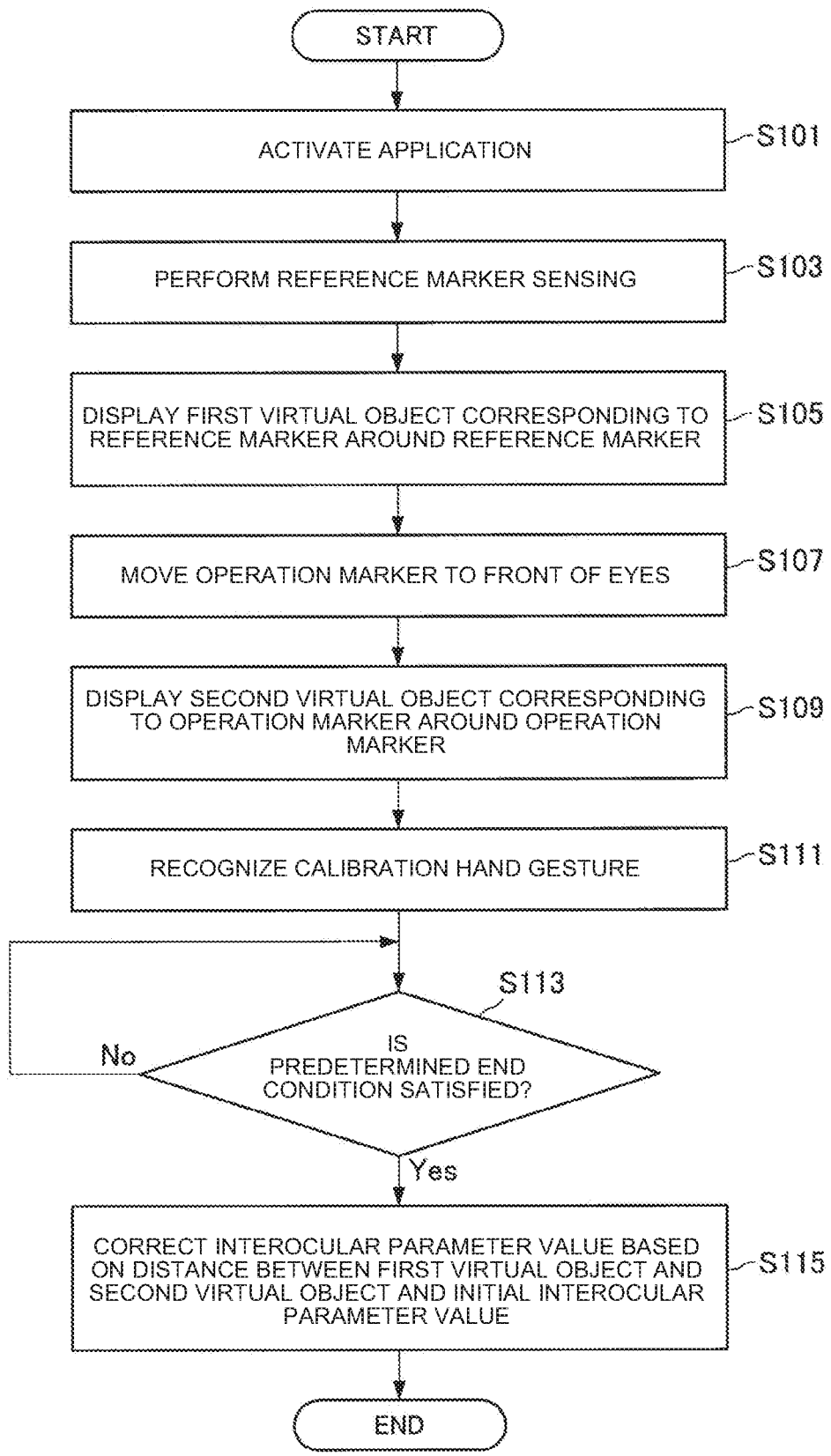
FIG. 10 is a diagram illustrating an exemplary process of processing according to the present embodiment.

The exemplary execution of the present embodiment is described above. The following describes the process of processing according to the present embodiment with reference to FIG. 10. FIG. 10 is a flowchart illustrating an exemplary process of processing according to the present embodiment. Note that, in this example, the first object and the second object are virtual objects.

As illustrated in FIG. 10, first, the control unit 100 of the eyewear 10 activates a predetermined application based on, for example, an input to the input unit 126 by the user (S101).

Subsequently, the recognition unit 102 recognizes a reference marker positioned around the eyewear 10 based on a result (for example, a captured image) of sensing by the sensor unit 122 (S103).

Subsequently, the display control unit 110 causes the display unit 124 to display, around the reference marker, a first virtual object corresponding to the reference marker recognized at S103 (S105).

Thereafter, the user holds an operation marker corresponding to the reference marker in hand and moves the operation marker to the front of the eyes. Then, the recognition unit 102 recognizes the operation marker based on a result (for example, a captured image) of sensing by the sensor unit 122 (S107).

Subsequently, the display control unit 110 causes the display unit 124 to display, around the operation marker, a second virtual object corresponding to the operation marker recognized at S107 (S109).

Thereafter, the display control unit 110 causes the display unit 124 to display a screen that prompts the user to perform a calibration hand gesture as illustrated in, for example, FIGS. 9A, 9B, 9C, 9D, and 9E. Thereafter, the user performs the calibration hand gesture in accordance with the screen. For example, the user moves the operation marker to move the second virtual object so that the second virtual object overlaps the first virtual object.

Then, the recognition unit 102 recognizes the calibration hand gesture based on a result (for example, a captured image) of sensing by the sensor unit 122, (S111).

Thereafter, the correction unit 108 waits until the above-described predetermined end condition is satisfied (No at S113).

When the predetermined end condition is satisfied (Yes at S113), the correction unit 108 corrects the interocular parameter value based on a result of measurement of the distance between the first virtual object and the second virtual object based on sensing by the sensor unit 122 and the current interocular parameter value (S115).

<2-4. Effect>

As described above, the eyewear 10 according to the present embodiment recognizes, based on a result of sensing by the sensor unit 122, a hand gesture performed by the user to move the second object closer to the first object so that the positional relation between the first object and the second object becomes the predetermined positional relation, and then corrects the interocular parameter related to virtual object display on the display unit 124 based on a result of recognition of the hand gesture when it is determined that the predetermined end condition is satisfied. Thus, the user can appropriately and easily correct the interocular parameter value related to virtual object display.

For example, according to the present embodiment, a load on the user is small as compared to an existing technology, and the interocular parameter value can be highly accurately corrected. For example, the interocular parameter value can be highly accurately corrected because a two-dimensional marker or the like, the absolute position of which can be acquired can be used as a reference marker. In addition, no dedicated measurement instrument (such as an interocular measurement instrument) is needed to correct the interocular parameter value.

Moreover, according to the present embodiment, since the correction processing can be performed during activation of a predetermined application, the user hardly feels a sense of procedure nor a sense of work. Thus, the user can comfortably perform an operation for the correction.

3. Exemplary Application

The present embodiment is not limited to the described-above examples. The following describes an exemplary application of the present embodiment. Note that each component included in the eyewear 10 according to the present exemplary application is same as that in the example illustrated in FIG. 2. Hereinafter, only the content of any difference from the above-described embodiment is described, and description of any identical content is omitted.

<3-1. Mode Change Unit 106>

{3-1-1. Exemplary Change 1}

The mode change unit 106 according to the present exemplary application switches the current mode between the normal mode and the correction mode in accordance with the progress status of a predetermined content being used by the user. For example, when a predetermined real object is detected based on a result of sensing by the sensor unit 122 while the predetermined content is in progress and the current mode is the normal mode, the mode change unit 106 switches the current mode from the normal mode to the correction mode. For example, the mode change unit 106 may switch the current mode from the normal mode to the correction mode each time the predetermined real object is detected while the predetermined content is in progress and the current mode is the normal mode. Note that the kind of the predetermined real object may be determined for each content.

Figure 11A:
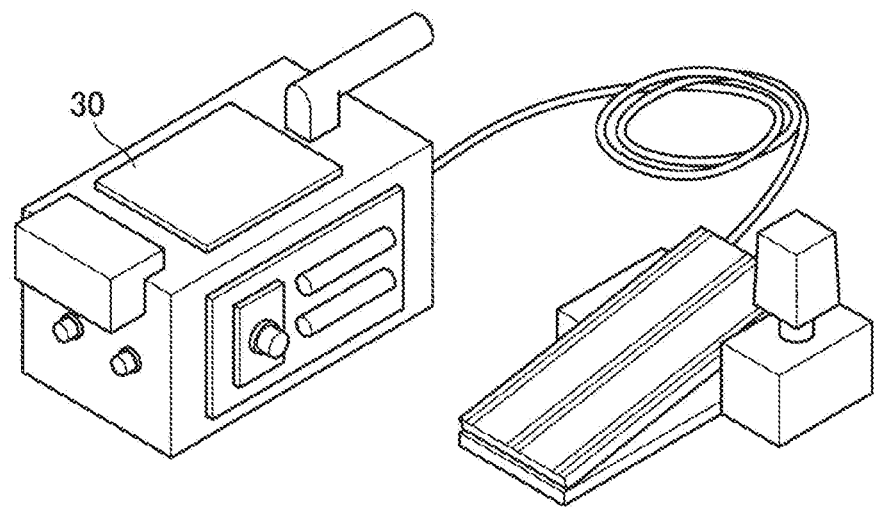
FIG. 11A is a diagram illustrating a part of an interocular parameter correction operation according to an exemplary application of the present embodiment.
Figure 11B:
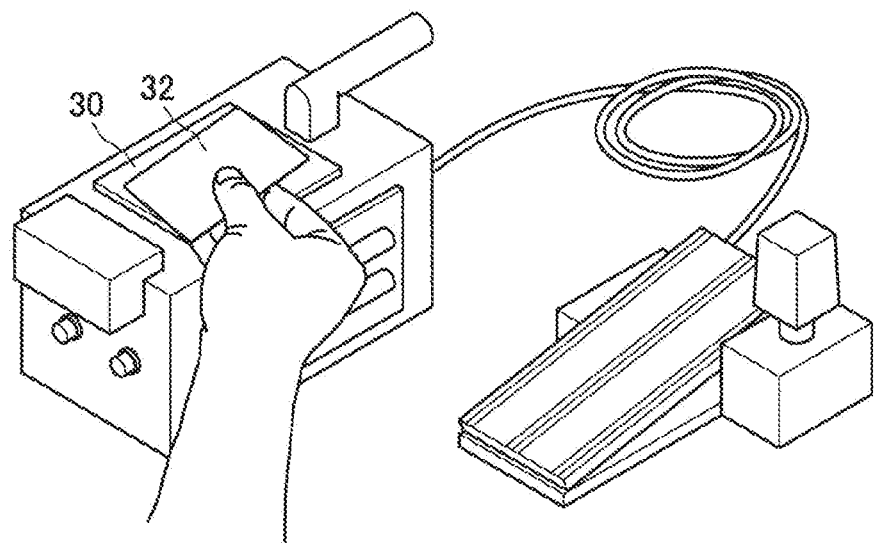
FIG. 11B is a diagram illustrating another part of the interocular parameter correction operation according to the exemplary application of the present embodiment.

The following describes the above-described function in more detail with reference to FIGS. 11A and 11B. For example, the predetermined content may be a predetermined game application. In this case, a scene in which the user disposes a prop in a predetermined region in real space may be prepared in advance in the predetermined game application. Then, when a user operation to place a predetermined card (or a virtual object superimposed on the predetermined card) over a virtual object superimposed on the prop is recognized, the correction unit 108 may correct the above-described interocular parameter based on a result of recognition of the operation. Accordingly, the interocular parameter can be appropriately adjusted while game characteristics are assured.

For example, first, the user disposes a prop 30 such as a trap box illustrated in FIG. 11A in a frame displayed in real space. Then, as illustrated in 11B, the user performs an operation to place a predetermined card 32 over a surface (for example, the top surface) of the prop 30 thus disposed. The operation is an exemplary calibration hand gesture.

When the operation is recognized and the above-described end condition is satisfied, the correction unit 108 may correct the above-described interocular parameter value based on a result of sensing of the distance between the surface of the prop 30 and the predetermined card 32.

(3-1-1-1. Modification)

As a modification, when the prop 30 is disposed in the frame in the example illustrated in FIG. 11A, the display control unit 110 may display a virtual object (for example, a cube) on, for example, the top surface of the prop 30. In this case, the user may perform a hand gesture that moves the predetermined card 32 closer to the virtual object so that the virtual object and the predetermined card 32 (or another virtual object displayed on the predetermined card 32 in a superimposed manner) overlap each other. Then, when the hand gesture is recognized and the above-described end condition is satisfied, the correction unit 108 of the eyewear 10 may correct the above-described interocular parameter value based on a result of measurement of the distance between the virtual object and the predetermined card 32.

{3-1-2. Exemplary Change 2}

Alternatively, the predetermined content may include a scene (for example, a positioning scene) in which the user disposes a predetermined object in a predetermined region in real space, and the eyewear 10 may determine whether disposition of the predetermined object in the scene is successful. The predetermined object may be a real object (for example, a box or a prop) or may be a virtual object.

Then, when it is detected that the user has failed disposition of the predetermined object in the predetermined region a predetermined number of times in a row in the scene, the mode change unit 106 may switch the current mode from the normal mode to the correction mode. For example, in this case, the eyewear 10 causes the display unit 124 to display a screen that prompts interocular parameter value correction as illustrated in FIGS. 9A, 9B, 9C, 9D, 9E, 9F, 9G, 9H, and 9I, thereby performing the above-described interocular parameter value correction processing.

In addition or alternatively, for example, during the scene or the like, the correction unit 108 may correct the currently set interocular parameter value as appropriate based on an operation of a predetermined input device (for example, a button or a foot pedal) by the user.

<3-2. Effect>

As described above, according to the present exemplary application, it is possible to correct the interocular parameter value while a predetermined content is in progress. For example, the user is prompted to perform an operation (such as a hand gesture) for calibration in the world view of a game. Accordingly, the interocular parameter value can be appropriately corrected without causing a sense of procedure to the user.

4. Hardware Configuration

The following describes an exemplary hardware configuration of the eyewear 10 according to the present embodiment with reference to FIG. 12. As illustrated in FIG. 12, the eyewear 10 includes the CPU 150, a read only memory (ROM) 152, a random access memory (RAM) 154, a bus 156, an interface 158, the input device 160, an output device 162, the storage device 164, and the communication device 166.

The CPU 150 functions as an arithmetic processing device and a control device and controls the entire operation in the eyewear 10 in accordance with various computer programs. In addition, the CPU 150 achieves, for example, the function of the control unit 100 in the eyewear 10. Note that the CPU 150 includes a processor such as a microprocessor.

The ROM 152 stores, for example, computer programs and control data such as calculation parameters, which are used by the CPU 150.

The RAM 154 temporarily stores, for example, computer programs executed by the CPU 150 and data in use.

The bus 156 includes a CPU bus. The bus 156 mutually connects the CPU 150, the ROM 152, and the RAM 154.

The interface 158 connects the input device 160, the output device 162, the storage device 164, and the communication device 166 to the bus 156.

The input device 160 includes an input unit used by the user to input information, such as a touch panel, a button, a switch, a lever, or a microphone, and an input control circuit generate an input signal based on an input by the user and output the input signal to the CPU 150. The input device 160 can function as the input unit 126.

The output device 162 includes a display such as an LCD or an OLED, or a display device such as a projector. In addition, the output device 162 may include a sound output device such as a speaker. The output device 162 can function as the display unit 124.

The storage device 164 is a data storage device that functions as, for example, the storage unit 128. The storage device 164 includes, for example, a storage medium, a record device configured to record data in a storage medium, a readout device configured to read data from a storage medium, or a deletion device configured to delete data recorded in a storage medium.

The communication device 166 is a communication interface including a communication device (such as a network card) for connecting to the communication network 22 and the like. The communication device 166 may be a wireless LAN compatible communication device, a Long-Term Evolution (LTE) compatible communication device, or a wired communication device configured to perform wired communication. The communication device 166 functions as the communication unit 120.

5. Modifications

Preferable embodiments of the present disclosure are described above in detail with reference to the accompanying drawings, but the technical scope of the present disclosure is not limited to such examples. Various changes and modifications could be thought of by a person having typical knowledge in the technical field of the present disclosure within the range of the technical idea written in the claims, and it should be understood that these changes and modifications belong to the technical scope of the present disclosure.

<5-1. Modification 1>

For example, the information processing device according to the present disclosure is not limited to the eyewear 10 but may be a device of another kind including components included in the control unit 100 described above. For example, these components may be included in the server 20 in place of the eyewear 10. In this case, the information processing device according to the present disclosure may be the server 20.

In this modification, for example, when the above-described calibration hand gesture is performed, the server 20 may first recognize the calibration hand gesture based on a result of sensing by the sensor unit 122, which is received from the eyewear 10. Then, when it is determined that the predetermined end condition is satisfied, the server 20 may correct the interocular parameter related to virtual object display on the display unit 124 of the eyewear 10 based on a result of recognition of the hand gesture.

<5-2. Modification 2>

Alternatively, the information processing device according to the present disclosure may be, for example, a general-purpose personal computer (PC), a tablet terminal, a game machine, a cellular phone such as a smartphone, a portable music player, a speaker, a projector, a wearable device such as a head-mounted display (HMD) or a smart watch, an on-board device (such as a car navigation device), or a robot (such as a humanoid robot, an automated drive vehicle, or a drone).

<5-3. Modification 3>

The steps of each above-described process of processing in the embodiment do not necessarily need to be processed in the written order. For example, the steps may be processed in a different order as appropriate. Instead of being processed in a temporally sequential manner, the steps may be processed partially in parallel or individually. Moreover, part of the written steps may be omitted, or another step may be added to the steps.

According to the above-described embodiment, it is possible to provide a computer program for causing hardware such as the CPU 150, the ROM 152, and the RAM 154 to achieve functions equivalent to those of components of the eyewear 10 according to the present embodiment. In addition, a storage medium in which the computer program is recorded is provided.

Effects stated in the present specification are explanatory or exemplary but not restrictive. Thus, the technology according to the present disclosure achieves, together with or in place of the above-described effects, any other effect that is obvious to the skilled person in the art from description of the present specification.

Note that configurations as described below belong to the technical scope of the present disclosure.

(1)

An information processing device comprising:

a recognition unit that recognizes, based on a result of sensing by a sensor unit corresponding to a viewpoint position of a user, a hand gesture performed by the user to move, closer to a first object, a second object so that the positional relation between the first object and the second object becomes a first positional relation; and a correction unit that corrects the user's interocular parameter related to virtual object display on a display unit based on a result of recognition of the hand gesture when it is determined that a predetermined end condition is satisfied, wherein at least one of the first object and the second object is a virtual object.

(2)

The information processing device according to (1), wherein the first object and the second object are three-dimensional objects.

(3)

The information processing device according to (2), wherein the first positional relation is a positional relation in which substantially the whole of the first object and substantially the whole of the second object overlap each other.

(4)

The information processing device according to (2), wherein the first positional relation is a positional relation in which the first object and the second object are adjacent to each other.

(5)

The information processing device according to (4), wherein the first object includes a first surface having irregularities, the second object includes a second surface having irregularities corresponding to the irregularities of the first surface, and the first positional relation is a positional relation in which the first object and the second object are adjacent to each other so that at least part of the irregularities of the first surface and at least part of the irregularities of the second surface are fitted to each other.

(6)

The information processing device according to (4), wherein the first positional relation is a positional relation in which any one of the first object and the second object is enclosed in an opening part of the other of the first object and the second object.

(7)

The information processing device according to (4), wherein the first object has a first surface including a first image, the second object has a second surface including a second image corresponding to the first image, and the first positional relation is a positional relation in which the first object and the second object are adjacent to each other while the positional relation between the first image and the second image is a second positional relation.

(8)

The information processing device according to any one of (2) to (7), wherein the correction unit corrects the user's interocular parameter related to the virtual object display based on a result of measurement of the distance between the first object and the second object when it is determined that the predetermined end condition is satisfied.

(9)

The information processing device according to (8), further comprising a display control unit configured to:

cause, when the first object is a virtual object, the display unit to display the first object in association with a first marker corresponding to the first object; and cause, when the second object is a virtual object, the display unit to display the second object in association with a second marker corresponding to the second object.

(10)

The information processing device according to (9), wherein the first object is a virtual object, and the correction unit corrects the user's interocular parameter related to the virtual object display based on a result of sensing of the distance between the viewpoint position of the user and the first marker and a result of measurement of the distance between the first object and the second object when it is determined that the predetermined end condition is satisfied.

(11)

The information processing device according to (9) or (10), wherein the first object and the second object are virtual objects.

(12)

The information processing device according to any one of (9) to (11), wherein the first object is a real object disposed in real space, the second object is a virtual object, and the hand gesture is a gesture that moves the second marker to move the second object closer to the first object.

(13)

The information processing device according to any one of (9) to (12), wherein at least a correction mode and a predetermined mode different from the correction mode are defined, in the correction mode, the recognition unit recognizes the hand gesture based on a result of sensing by the sensor unit, and when it is determined that the hand gesture is ended in the correction mode, the correction unit corrects the user's interocular parameter related to the virtual object display.

(14)

The information processing device according to (13), further comprising a mode change unit that switches the current mode from the predetermined mode to the correction mode in accordance with the progress status of a predetermined content being used by the user.

(15)

The information processing device according to (14), wherein, when a predetermined real object is detected based on a result of sensing by the sensor unit while the predetermined content is in progress in the predetermined mode, the mode change unit switches the current mode from the predetermined mode to the correction mode.

(16)

The information processing device according to (14), wherein the predetermined content includes a scene in which a predetermined virtual object is disposed in a predetermined region in real space, and when it is detected that the user has failed in disposing the predetermined virtual object a plurality of times in the scene in the predetermined mode, the mode change unit switches the current mode from the predetermined mode to the correction mode.

(17)

The information processing device according to any one of (9) to (16), wherein a case in which it is determined that the predetermined end condition is satisfied includes a case in which it is determined that the hand gesture is ended.

(18)

The information processing device according to any one of (9) to (17), further comprising the sensor unit, wherein the information processing device is a head-mounted device.

(19)

An information processing method comprising:

recognizing, based on a result of sensing by a sensor unit corresponding to a viewpoint position of a user, a hand gesture performed by the user to move, closer to a first object, a second object so that the positional relation between the first object and the second object becomes a first positional relation; and correcting, by a processor, the user's interocular parameter related to virtual object display on a display unit based on a result of recognition of the hand gesture when it is determined that a predetermined end condition is satisfied, wherein at least one of the first object and the second object is a virtual object.

(20)

A computer program configured to cause a computer to function as:

a recognition unit that recognizes, based on a result of sensing by a sensor unit corresponding to a viewpoint position of a user, a hand gesture performed by the user to move, closer to a first object, a second object so that the positional relation between the first object and the second object becomes a first positional relation; and a correction unit that corrects the user's interocular parameter related to virtual object display on a display unit based on a result of recognition of the hand gesture when it is determined that a predetermined end condition is satisfied, wherein at least one of the first object and the second object is a virtual object.

REFERENCE SIGNS LIST 10 eyewear
20 server
22 communication network
30 reference marker
32 operation marker
100 control unit
102 recognition unit
104 position information acquisition unit
106 mode change unit
108 correction unit
110 display control unit
120 communication unit
122 sensor unit
124 display unit
126 input unit
128 storage unit

The invention claimed is:

1. An information processing device, comprising:
a central processing unit (CPU) configured to:
recognize, based on a result of a first sensing operation by a sensor, a hand gesture of a user, wherein
the hand gesture is to move, closer to a first object, a second object so that a positional relation between the first object and the second object becomes a first positional relation,
the result of the first sensing operation corresponds to a viewpoint position of the user,
the first object and the second object are three-dimensional objects, and at least one of the first object or the second object is a virtual object;

control, in a case where the first object is the virtual object, a display unit to display the first object in association with a first marker corresponding to the first object;

control, in a case where the second object is the virtual object, the display unit to display the second object in association with a second marker corresponding to the second object;

determine a specific end condition is satisfied; and correct an interocular parameter of the user based on the recognition of the hand gesture, a distance between the first object and the second object, and the determination the specific end condition is satisfied, wherein the interocular parameter is associated with at least one of the display of the first object or the display of the second object.

2. The information processing device according to claim 1, wherein in the first positional relation, an entirety of the first object overlaps an entirety of the second object.

3. The information processing device according to claim 1, wherein in the first positional relation, the first object is adjacent to the second object.

4. The information processing device according to claim 3, wherein the first object includes a first surface having irregularities, the second object includes a second surface having irregularities corresponding to the irregularities of the first surface, and in the first positional relation, the first object is adjacent to the second object so that at least a part of the irregularities of the first surface is fitted to at least a part of the irregularities of the second surface.

5. The information processing device according to claim 3, wherein in the first positional relation, the first object is enclosed in an opening part of the second object or the second object is enclosed in an opening part of the first object.

6. The information processing device according to claim 3, wherein the first object has a first surface including a first image, the second object has a second surface including a second image corresponding to the first image, and in the first positional relation, the first object is adjacent to the second object and the first image is in a second positional relation with the second image.

7. The information processing device according to claim 1, wherein the first object is the virtual object, and the CPU is further configured to correct the interocular parameter based on a distance between the viewpoint position of the user and the first marker, the distance between the first object and the second object, and the determination the specific end condition is satisfied.

8. The information processing device according to claim 1, wherein the first object and the second object are virtual objects.

9. The information processing device according to claim 1, wherein the first object is a real object in real space, the second object is the virtual object, and the hand gesture moves the second marker to move the second object closer to the first object.

10. The information processing device according to claim 1, wherein in a correction mode, the CPU is further configured to:

recognize the hand gesture based on the result of the first sensing operation by the sensor;

determine the hand gesture is ended; and correct the interocular parameter based on the determination the hand gesture is ended.

11. The information processing device according to claim 10, wherein the CPU is further configured to switch from a specific mode to the correction mode based on a progress status of specific content used by the user.

12. The information processing device according to claim 11, wherein, in a case where a specific real object is detected based on a result of a second sensing operation by the sensor while the specific content is in progress in the specific mode, the CPU is further configured to switch from the specific mode to the correction mode.

13. The information processing device according to claim 11, wherein the specific content includes a scene in which a specific virtual object is in a specific region in real space, and the CPU is further configured to:

detect the user has failed in disposing the specific virtual object a plurality of times in the scene in the specific mode; and switch from the specific mode to the correction mode based on the detection.

14. The information processing device according to claim 1, wherein the determination the specific end condition is satisfied includes determination that the hand gesture is ended.

15. The information processing device according to claim 1, further comprising the sensor, wherein the information processing device is a head-mounted device.

16. An information processing method, comprising:

recognizing, based on a result of a sensing operation by a sensor, a hand gesture of a user, wherein the hand gesture is to move, closer to a first object, a second object so that the first object is in a specific positional relation with the second object, the result of the sensing operation corresponds to a viewpoint position of the user, the first object and the second object are three-dimensional objects, and at least one of the first object or the second object is a virtual object;

controlling, in a case where the first object is the virtual object, a display unit to display the first object in association with a first marker corresponding to the first object;

controlling, in a case where the second object is the virtual object, the display unit to display the second object in association with a second marker corresponding to the second object;

determining a specific end condition is satisfied; and correcting an interocular parameter of the user based on the recognition of the hand gesture, a distance between the first object and the second object, and the determination the specific end condition is satisfied, wherein the interocular parameter is associated with at least one of the display of the first object or the display of the second object.

17. A non-transitory computer-readable medium having stored thereon computer-executable instructions that, when executed by a processor, cause the processor to execute operations, the operations comprising:
- recognizing, based on a result of a sensing operation by a sensor, a hand gesture of a user, wherein
  - the hand gesture is to move, closer to a first object, a second object so that the first object is in a specific positional relation with the second object,
  - the result of the sensing operation corresponds to a viewpoint position of the user,
  - the first object and the second object are three-dimensional objects, and
  - at least one of the first object or the second object is a virtual object;
- controlling, in a case where the first object is the virtual object, a display unit to display the first object in association with a first marker corresponding to the first object;
- controlling, in a case where the second object is the virtual object, the display unit to display the second object in association with a second marker corresponding to the second object;
- determining a specific end condition is satisfied; and
- correcting an interocular parameter of the user based on the of recognition of the hand gesture, a distance between the first object and the second object, and the determination the specific end condition is satisfied,
  - wherein the interocular parameter is associated with at least one of the display of the first object or the display of the second object.

18. An information processing device, comprising:
- a central processing unit (CPU) configured to:
  - recognize, based on a result of a sensing operation by a sensor, a hand gesture of a user, wherein
    - the result of the sensing operation corresponds to a viewpoint position of the user,
    - the hand gesture is to move, closer to a first object, a second object so that a positional relation between the first object and the second object becomes a first positional relation,
    - the first object has a first surface including a first image,
    - the second object has a second surface including a second image corresponding to the first image,
    - in the first positional relation, the first object is adjacent to the second object and the first image is in a second positional relation with the second image,
    - the first object and the second object are three-dimensional objects, and
    - at least one of the first object or the second object is a virtual object;
  - determine a specific end condition is satisfied; and
  - correct an interocular parameter of the user based on the recognition of the hand gesture and the determination the specific end condition is satisfied, wherein the interocular parameter is associated with display of the virtual object on a display unit.

* * * * *